United States Patent [19]
Sumi

[11] Patent Number: 5,734,807
[45] Date of Patent: Mar. 31, 1998

[54] IMAGE PROCESSING DEVICES AND METHODS

[75] Inventor: Masayuki Sumi, Tokyo, Japan

[73] Assignee: Kabushiki Kaisha Sega Enterprises, Tokyo, Japan

[21] Appl. No.: 496,763

[22] Filed: Jun. 29, 1995

[30] Foreign Application Priority Data

Jul. 21, 1994 [JP] Japan .................... 6-169856

[51] Int. Cl.⁶ .................................... G06T 1/00
[52] U.S. Cl. .................... 395/127; 395/133; 395/120; 463/32; 463/2; 463/5
[58] Field of Search .................... 395/152, 119, 395/125, 133, 122, 127, 173-175; 345/122, 118-121; 463/1-5, 29-34

[56] References Cited

U.S. PATENT DOCUMENTS

| | | | |
|---|---|---|---|
| 4,813,682 | 3/1989 | Okada | 273/312 |
| 4,862,392 | 8/1989 | Steiner | 364/522 |
| 5,261,041 | 11/1993 | Susman | 395/152 |
| 5,329,613 | 7/1994 | Brase et al. | 395/122 |
| 5,363,475 | 11/1994 | Baker et al. | 395/122 |
| 5,384,719 | 1/1995 | Baker et al. | 364/578 |
| 5,515,489 | 5/1996 | Yaeger | 395/152 |
| 5,572,634 | 11/1996 | Duluk, Jr. | 395/119 |
| 5,613,049 | 3/1997 | Brechner et al. | 395/120 |

Primary Examiner—Joseph H. Feild
Attorney, Agent, or Firm—Finnegan, Henderson, Farabow, Garrett & Dunner, L.L.P.

[57] ABSTRACT

An image processing device displays an object having three-dimensional coordinates on a display as if the image of the object were viewed by a camera placed at a predetermined position and at a predetermined angle to a reference axis. The image processing device is composed of a game device body and the display. The game device body is composed of a control panel 1a, a data processor and a memory. The data processor is composed of a CPU which included an intersection determining unit and a shot hole calculating unit. The memory is composed of a ROM and a RAM. The intersection determining unit determines an intersection or an orbit of a virtual projectile with a virtual plane W for the object on the basis or polygon model data Dp and relative coordinate/angle data Dk on the virtual plane W from the ROM, and a trajectory data input from the control panel. The calculating unit calculates a display point on an image viewed by the camera to which the intersection is projected, and calculates the position of absolute coordinates on the virtual plane which the display point occupies.

23 Claims, 11 Drawing Sheets

IMAGE PROCESSING DEVICES AND METHODS

BACKGROUND OF THE INVENTION

1. Field of the Invention

The present invention relates to image processing devices and methods, and more particularly to an image processing device and method which rapidly determines the intersection of a locus or trajectory of a projectile or the like with a three-dimensional image. More particularly, the present invention relates to a game device which plays a shooting game or the like, and to an image processing device which determines whether an object (character) in a game space is shot and which displays the resulting shot hole, if any, easily and rapidly in spite of a change in the view point.

2. Statement of the Prior Art

Generally, game devices display images in real-time. The game devices are composed of a game unit body, which executes programs of various pre-stored games, a controller, which gives various operational commands to the game unit body, and a display, which shows the result of the operation performed by the game unit body.

In the game device, an image, which includes various objects, is shown on the display and the objects on the display perform predetermined acts under control of the controller.

For example, in a shooting game, when the player aims and fires a gun unit (controller), which includes a photosensor or the like, at an object on the display, the game unit calculates the flying direction of a virtual projectile and determines whether the projectile has hit the object on the display. If so, the object with a shot hole caused by the hit is shown on the display.

Most of the conventional game devices use two-dimensional graphic techniques. Thus, the object is always only shown on the display as a single plane figure viewed from a fixed viewpoint. Therefore, by determining the hit of a projectile on the single plane figure, it is easily determined whether the object was shot. That is, in a game using the two-dimensional graphic technique, the determination of a hit is achieved only by calculating the coordinates of the two-dimensional plane; accordingly, processing is achieved at high speed. Similarly, since a process for forming a shot hole on the plane is achieved by calculating coordinates of the shot hole on the two-dimensional plane, this processing is also achieved at high speed.

However, a display screen for a shooting game, using such two-dimensional graphics, is a plane and gives a poor sense of reality. Recently, a game which uses a three-dimensional graphic technique has been developed in which an object in the three-dimensional space is composed of flat polygons such as triangles and squares and shown on the display.

In this three-dimensional game device, the polygons which compose the object have three-dimensional coordinate data, on the basis of which the object viewed from a predetermined viewpoint is shown on the display screen.

When the viewpoint moves or the perspective changes, a process is performed in which an image viewed from a point to which the viewpoint has moved or in which an image corresponding to the change in the perspective is calculated from absolute coordinate data and displayed on the monitor. In order to improve the sense of reality in the game, an object viewed from every viewpoint is displayed.

However, calculation for changing the position, angle and size, for example, of a mark (shot hole) displayed at a point on the object, is again required in accordance with the movement of the viewpoint and the change in perspective. Execution of such calculation for every polygon each time the viewpoint moves and the perspective changes puts a large load on an arithmetic operation device and hence leads to slowing of the game processing speed itself.

Thus, a conventional game device which has a game space based on three-dimensional data does not perform data processing to display a mark such as a shot hole under the present circumstances.

In order to determine whether an object has been shot, it must be determined whether any of the polygons (for example, in the case of a solid, a total of six surfaces; a top surface, four side surfaces and a bottom surface) which constitute the surfaces of the object have been shot, so that the processing time required to determine this increases.

OBJECTS AND SUMMARY OF THE INVENTION

It is therefore an object of the present invention to provide an image processing device which is capable of easily and rapidly performing the data processing required for an object without applying image processing to each polygon.

Another object of the present invention is to provide an image processing device which is capable of rapidly determining the presence/absence of the intersection of an object with an orbit (locus) such as a trajectory.

Still another object of the present invention is to provide an image processing device which is capable of easily and rapidly calculating and displaying an area of such intersection even when the viewpoint moves.

In order to achieve the above objects, according to the present invention, an image processing device is provided in which an object expressed with three-dimensional coordinate data is converted into a two-dimensional image viewed from a predetermined viewpoint and the two-dimensional image is shown on display means, including:

object data storage means for storing coordinate data of the object; and data processing means for setting a predetermined virtual plane around the object on the basis of the coordinate data of the object and for processing the data of the object on the basis of the data on the position of the virtual plane.

According to the present invention, there is also provided an image processing method where an object expressed by three-dimensional coordinate data is converted to a two-dimensional image viewed from a predetermined viewpoint and the two-dimensional image is shown on display means, comprising the steps of:

storing data defining the coordinates of the object;

setting a predetermined virtual plane around the object on the basis of the data defining the coordinates of the object; and determining whether the locus intersects with the virtual plane on the basis of the data on the position of the virtual plane and data defining the position of the predetermined orbit.

The inventive image processing device is arranged such that a predetermined virtual plane is set for an object and data processing required for the object is performed on the basis of data on such virtual plane. For example, a hit of a projectile to the object or the formation of a resulting shot hole on the object is replaced with the hit of the projectile on the virtual plane or the formation of a resulting shot hole on the virtual plane. As a result, data defining the formation of the virtual plane is used as data required for processing object data, for example, on the presence/absence or formation of the shot hole. Processing data on the respective points (for example, the respective polygons) of the object is avoided.

As an example of this data processing, to determine the presence/absence of an intersection of a predetermined locus with an object, object data subject to this determination is generally restricted to data on the virtual plane. Therefore, it is easy to determine the presence/absence of an intersection.

When an intersection area is displayed on the object, conversion of data defining the intersection area into display data reduces the quantity or data to be processed because the data to be converted is within a range of data on the virtual plane. And thus the calculation speed of the processing is improved compared to the case of processing data for all of the respective points of the object.

When the intersection of the aimed trajectory of the gun unit with the virtual surface is determined, determination of a hit of a projectile on the object and the display of a resulting shot hole are simplified and speeded up.

By setting flat virtual surfaces in the vicinity of the outer plane of the object, a shot hole appears normally on the surface of the object.

By using the result or the determination of a virtual plane having the highest priority, the execution of a process for displaying the intersection areas of all the virtual planes is prevented in order to improve the processing speed.

Determination of whether the intersection area exists within the confinement of the virtual plane is made based on the data related to the position of the area in the display coordinate system of the display means where the orbit intersects and the data defining the position in the display coordinate system of the display means where the virtual plane is projected. The orbit intersects the virtual plane when the intersection area exists within the confines of the virtual plane the orbit intersects the virtual plane. Therefore, by using two-dimensional coordinate data to define the area where the virtual plane in the display coordinate system intersects the orbit, the determination of the presence/absence of the intersection of the orbit with the virtual surface is facilitated.

DESCRIPTION OF THE PREFERRED EMBODIMENT

A preferred embodiment of the present invention will be described with reference to the accompanying drawings. In the present embodiment, a shooting game device in which the player shoots at an object on a display with a gun unit will be described next as an example.

Figure 1:
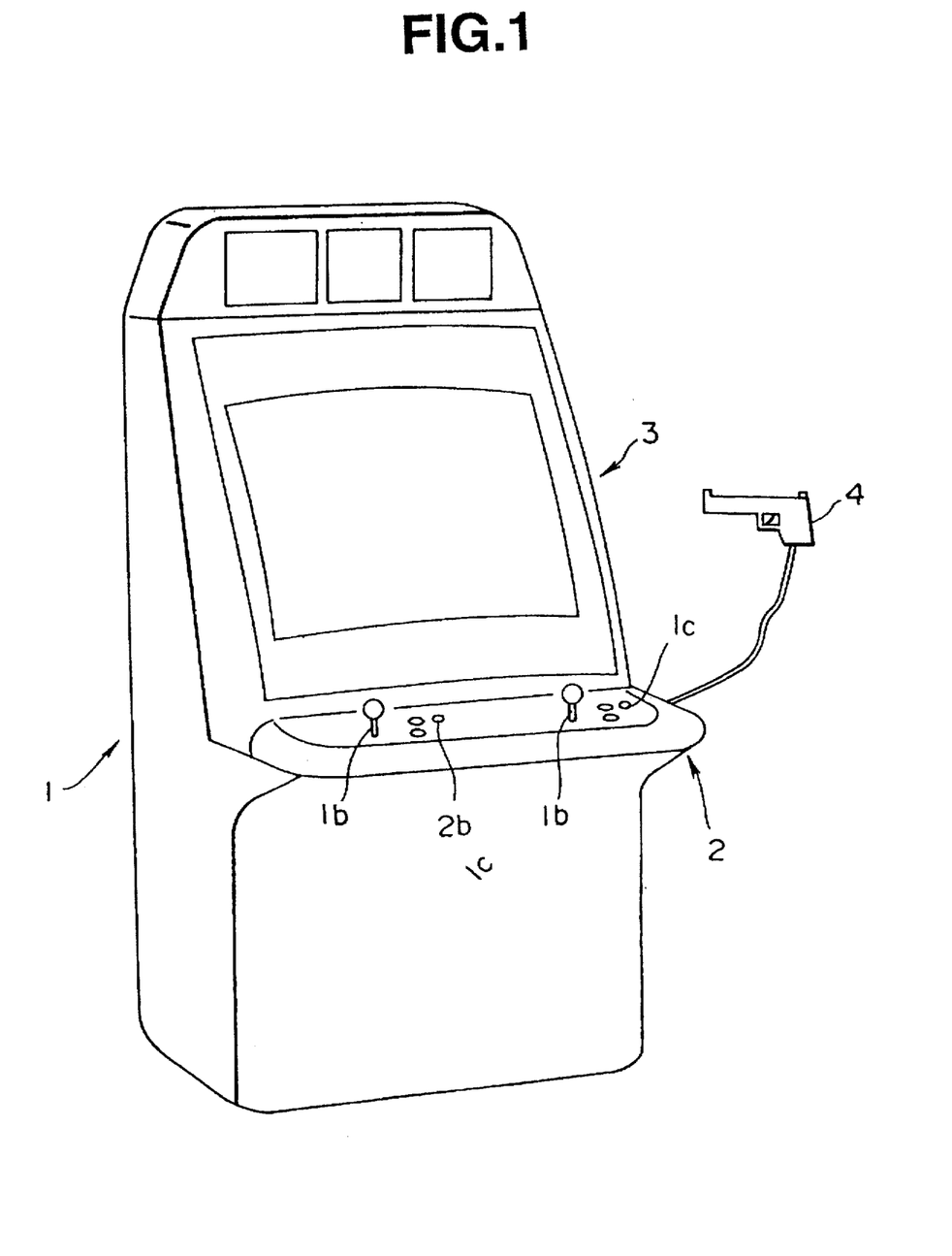
FIG. 1 shows a perspective view of an embodiment of a game device to which the present invention is applied.

FIG. 1 is a perspective view of the shooting game device of the present embodiment. In FIG. 1, a housing 1 takes substantially the form of a console in which a game processing board and other elements are provided. The housing 1 has on its front a CRT-type display 3 and a control panel 1a, which has joysticks 1b and operation buttons 1c thereon. A gun unit 4 is connected through a cable to the housing 1. Displayed on the display 3 is an object (shooting target) expressed in three-dimensional graphics. The player holds the gun unit 4, and aims and fires it at the object, which leads to the calculation of a virtual trajectory and the determination of whether or not the object was shot. If so, the object with a shot hole is displayed on the display 3.

Figure 2:
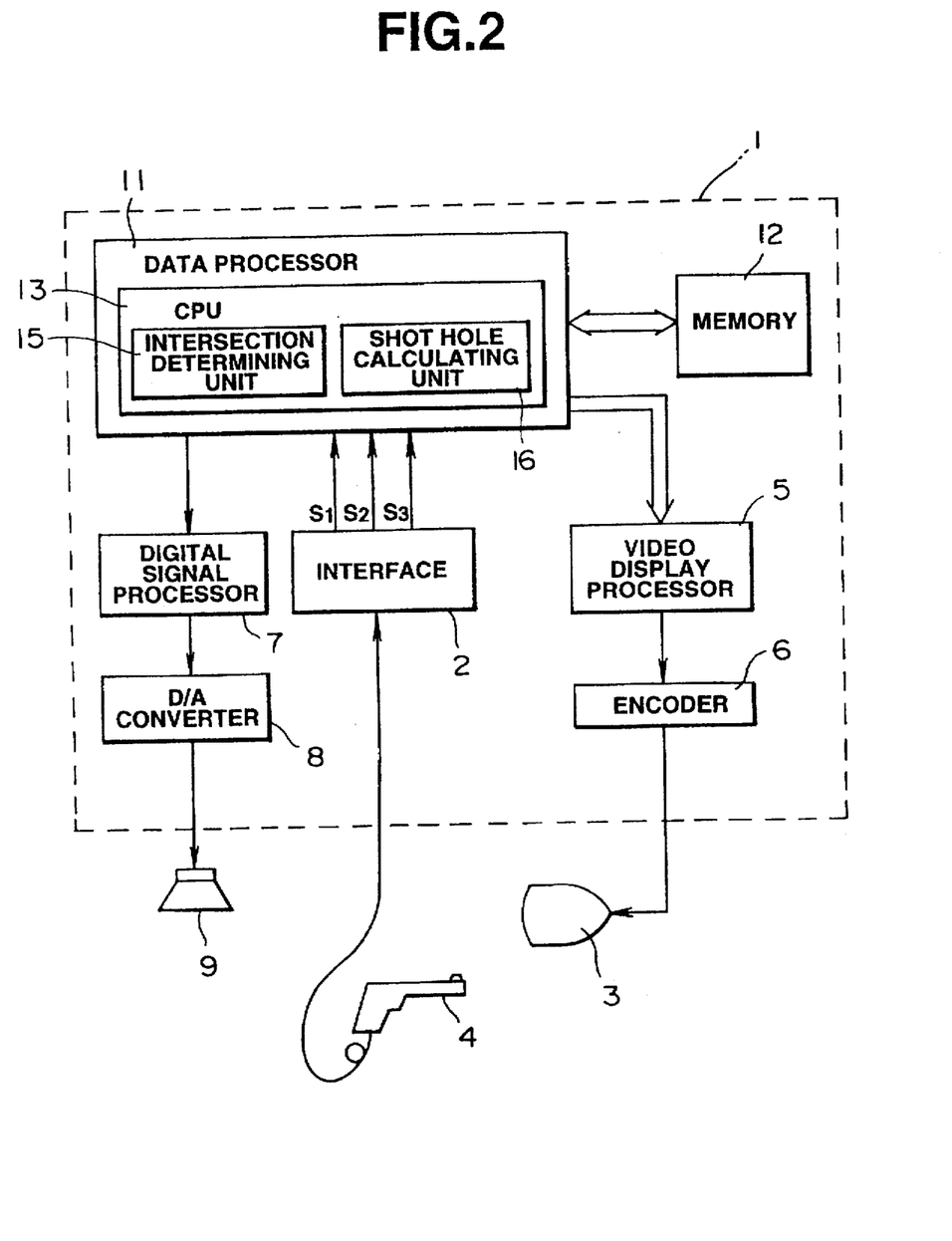
FIG. 2 is a block diagram indicative of the game device of FIG. 1.

FIG. 2 is a block diagram of the game device body 1 of the embodiment. The game device body 1 is composed of a data processor 11, a memory 12, an interface (I/F) 2, the display 3, the gun unit 4, a VDP (video display processor) 5, an encoder 6, a digital signal processor (DSP) 7, a D/A converter 8 and a speaker 9.

The gun unit 4 is composed of a photosensor (not shown) which senses light emitted from the display, and a switch (not shown) connected to the trigger of the gun unit 4, etc., which are connected through a cable to the I/F 2. The I/F 2 produces aimed x coordinate data S1, aimed y coordinate data S2, and trigger-on/off data S3 on the basis of signals from the photosensor and switch. The I/F 2 outputs these data to the data processor 11. The aimed x and y coordinate data S1 and S2 represent the coordinates on the display 3 aimed at by the gun unit 4.

The data processor 11 performs various processing operations caused by the execution of the game and includes a CPU 13, etc., which is composed of an intersection determining unit 15 which determines whether a virtual projectile has hit the object and a shot hole calculating unit 16 which calculates the coordinates of a shot hole resulting from the hit of the projectile. The memory 12 contains a game program which represents the-sequence of processing by the CPU 13, polygon model data representing the object (three-dimensional coordinate data on the respective polygons), etc., relative coordinate/angle data on the virtual planes, and data on required variables and coordinates. The virtual planes are flat planes which constitute a virtual box which contains an object as a target. The use of the virtual flat surfaces is one of the preferable aspects of the invention, but, of course, the present invention is not restricted to the use of such planes alone, this will be described later in more detail.

The data processor 11 is as required capable of changing the position of the viewpoint opposite the object (i.e. the three-dimensional image), and also producing an image of the object viewed from the viewpoint. The data processor 11 converts the coordinates of the respective vertexes of polygons, data for which is stored in the memory 12. The VDP 5 produces display data obtained by projecting polygon data, which has been subjected to coordinate conversion, on a 2-dimensional plane. The encoder 6 adds synchronizing signals, etc., to the display data to produce a video signal, which is output to the display 3 to thereby display a game picture including the object on the display 3.

A DSP (Digital Signal Processor) 7 has a PCM sound source and functions so as to produce sound data on the basis of the data output from the data processor 11. The sound data is converted by the D/A converter 8 to an analogue signal, which is then output through an amplifier (not shown) to the speaker 9. As a result, sound effects and music depending on the stage of the game are reproduced.

Figure 3:
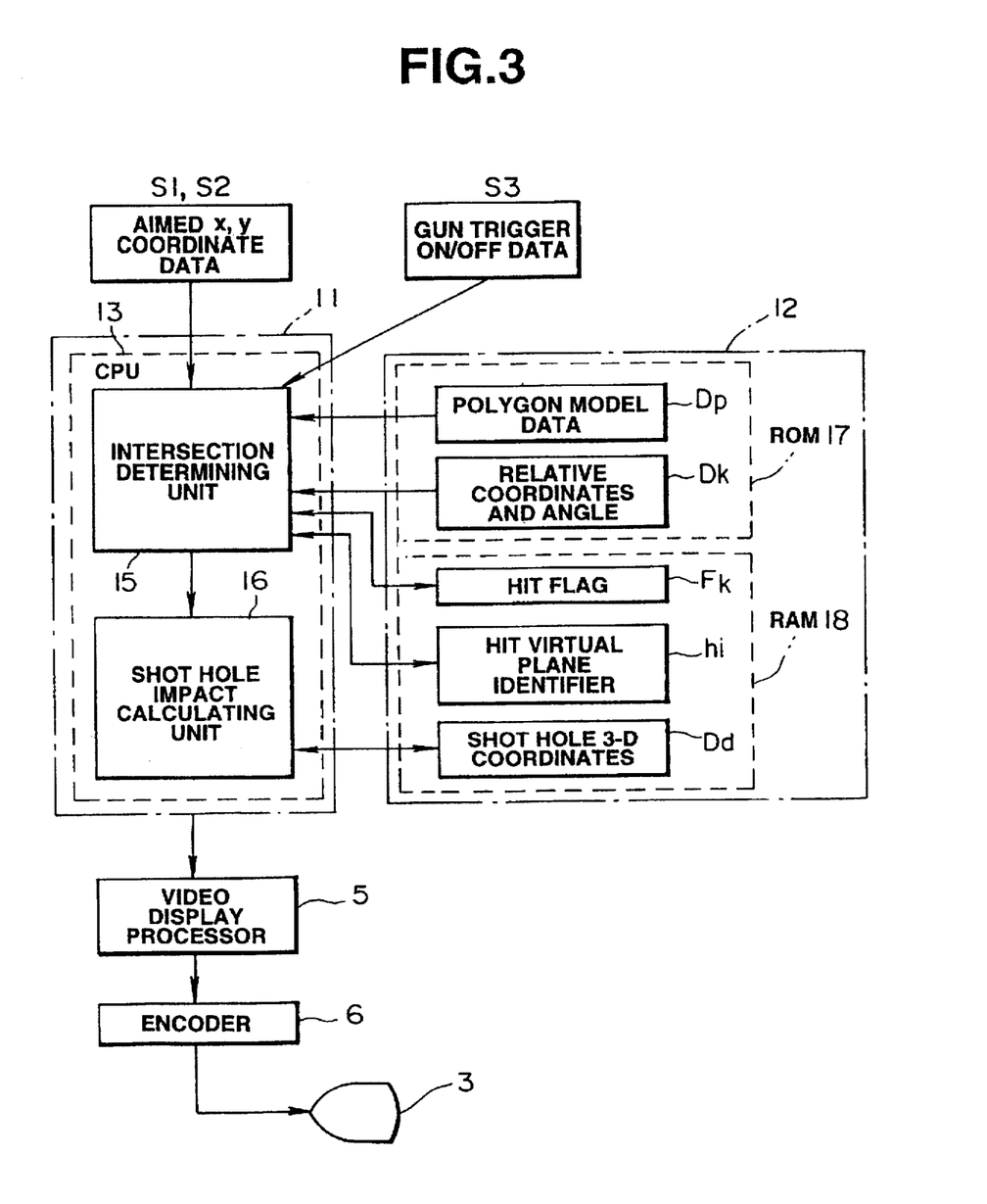
FIG. 3 is a block diagram indicative of the processing function of the game device of FIG. 2.

FIG. 3 is a block diagram indicative of the details or the data processor 11 and the memory 12, etc. As shown in FIG. 2, when the player aims and fire the gun unit 4 at the display 3, the I/F 2 produces aimed x and y coordinate data S1 and S2 and trigger data S3, which is then delivered to the intersection determining unit 15 of the CPU 13 (FIG. 2).

The memory 12 is composed of a ROM 17 which contains polygon model data Dp and relative coordinate/angle data Dk; and a RAM 18 which stores a hit flag Fk, a hit virtual plane identifier hi and three-dimensional coordinate data Dd for a shot hole. The ROM 17 is connected to the intersection determining unit 15 while the RAM 18 is connected to the intersection determining unit 15 and the shot hole calculating unit 16.

Figure 6:
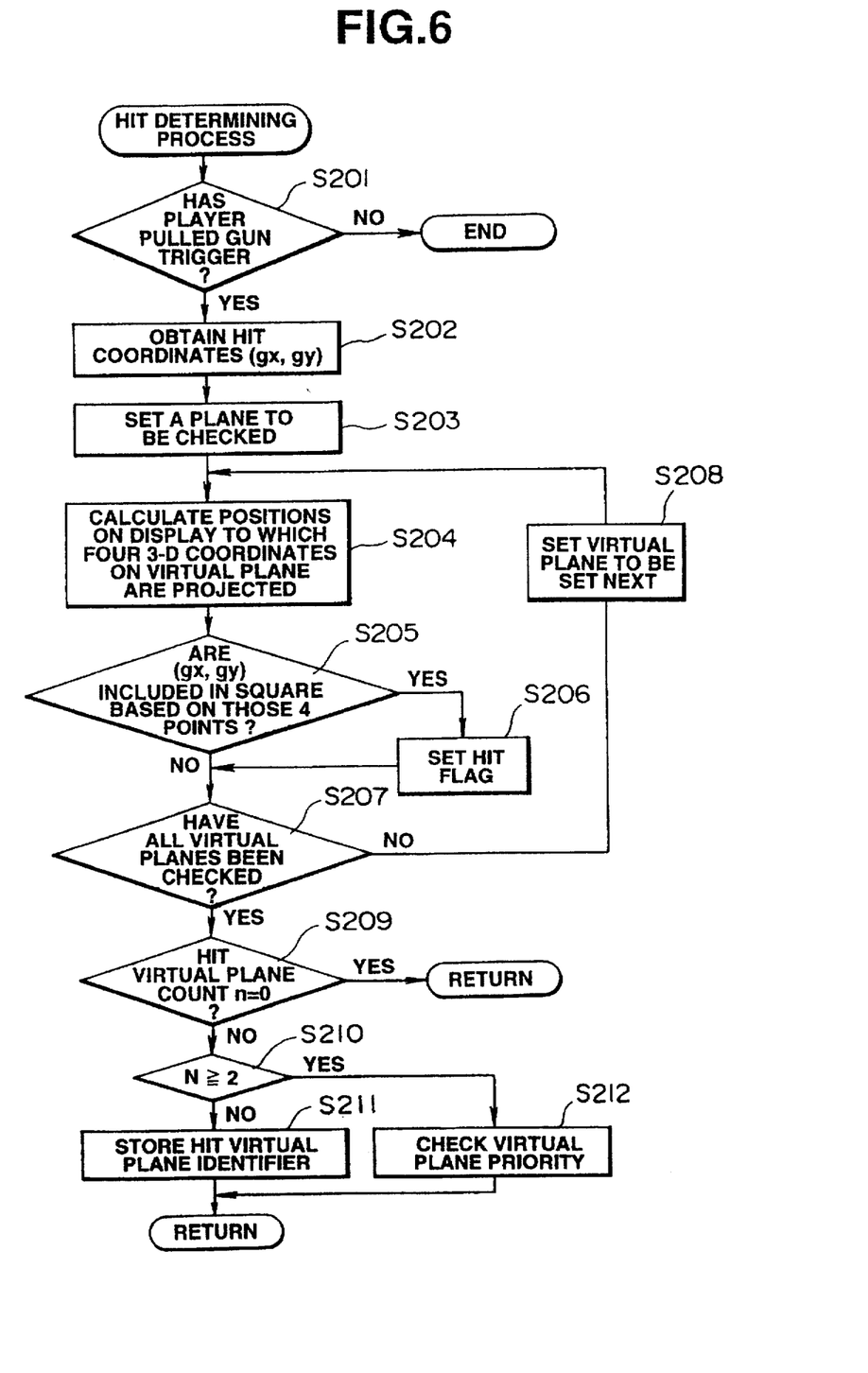
FIG. 6 is a flow chart indicative of a hit determination process of the embodiment.
Figure 7:
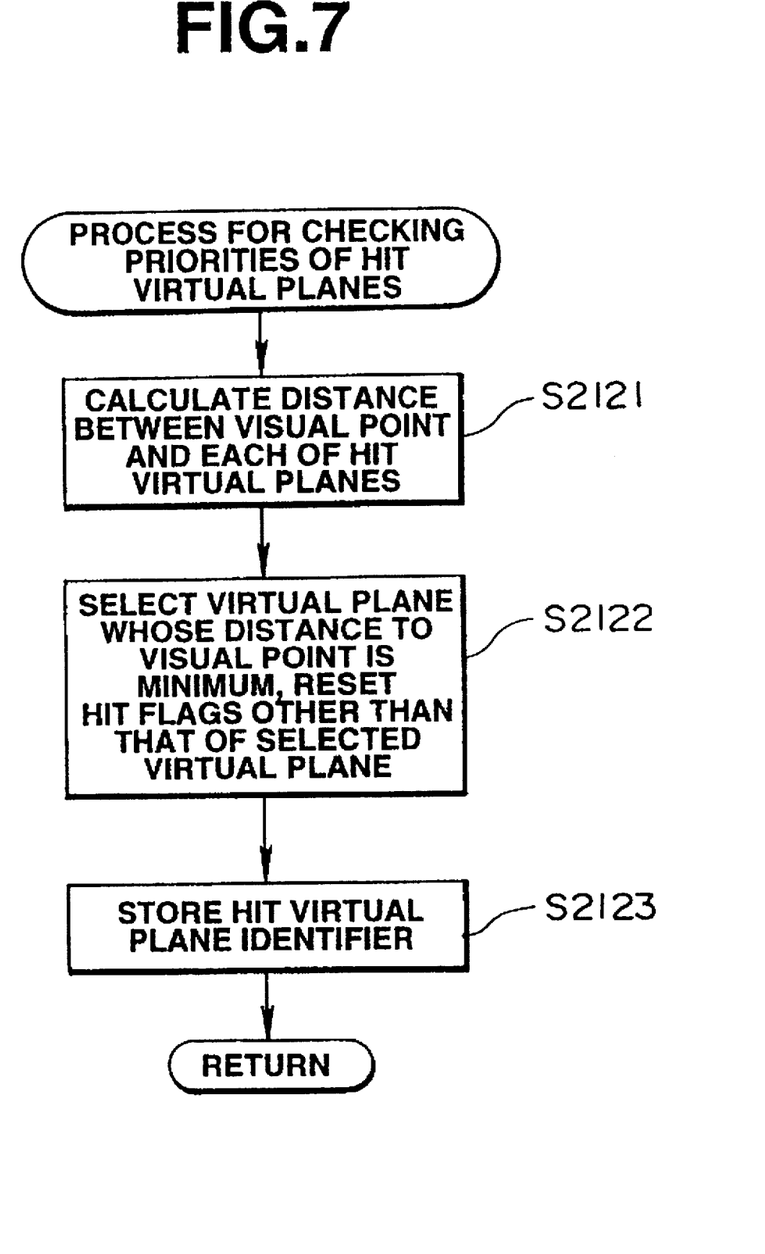
FIG. 7 is a flow chart indicative of the determination of the priority used in the determination of the intersection in the embodiment.

The intersection determining unit 15 fetches the data S1, S2, S3 and as required, the relative coordinate/angle data Dk and polygon model data Dp in the ROM 17, executes the process indicated by the flow charts of FIGS. 6 and 7 and determines on the basis of those data whether the virtual projectile which is aimed at the object hits the virtual plane around the object.

Figure 4:
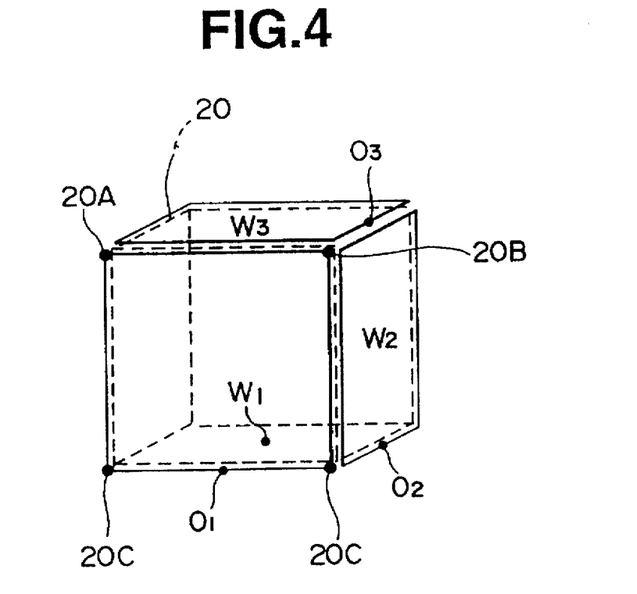
FIG. 4 illustrates an object and virtual planes used in the embodiment.

The virtual plane used in the determination by the intersection determining unit 15 will be described below with reference to FIG. 4, which is a conceptual view of a virtual plane used in the determination of the intersection of a virtual projectile with the virtual plane. As shown in FIG. 4, a plurality of virtual planes is combined into a box which covers the object. For example, when the object is an image representing a person, the plurality of virtual planes is combined into a shape which surrounds the person. The virtual planes shown in those FIGURES are only illustrative and other virtual planes suitable for the shape of the object may be used, of course.

In FIG. 4, assume a cubic object 20, which is actually composed of a combination of polygons. The three-dimensional coordinates of each polygon are stored as polygon model data in the ROM 18.

Assume that as the surfaces of the object 20 for determining the intersection, for example, the same virtual planes W1, W2 and W3 as the respective projected ones of front, right, left and top surfaces of the object 20 are attached to those projected surfaces of the object 20. That is, those virtual planes are set close to the outer surface of the object 20 and data on the virtual planes are stored as position data beforehand in the ROM 18. Those data express three-dimensional coordinates relative to the origin coordinates of the virtual plane and data on angles of the respective virtual planes to an absolute reference axis.

Reference symbols O1, O2, and O3 denote the origins of respective virtual planes W1, W2 and W3, respectively. The relative coordinate data is composed of data on the coordinates of the originals, and data on the coordinates of the corners (20A–D of FIG. 4) or the respective virtual planes relative to the originals.

The virtual planes W1, W2 and W3 are not necessarily required to be attached to all the projected surfaces of the object 20, but may be attached to only those surfaces which appear as the front of the object on the display 3.

Figure 5:
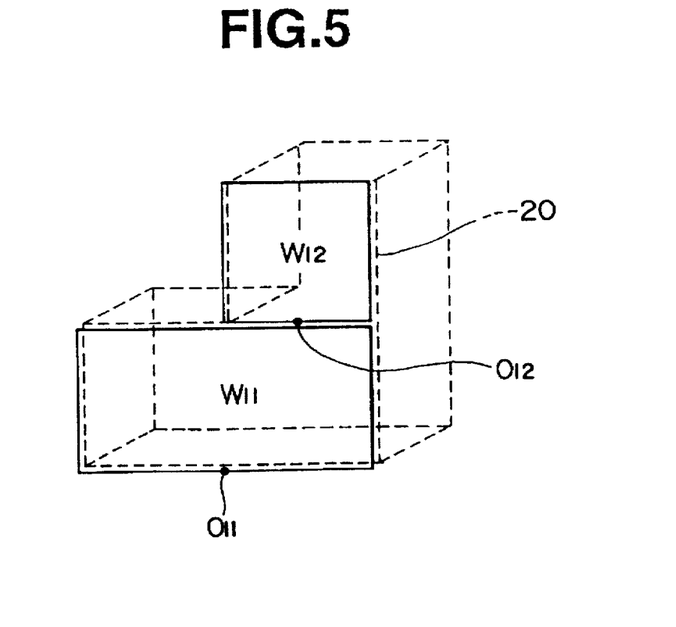
FIG. 5 illustrates another object and virtual planes used in the embodiment.

For an object 20 of a modified type such as is shown in FIG. 5, two virtual planes W11 and W12 are only required to be attached, as shown. A plurality of planes may be provided such as preferably coincides with the approximated shape of the object. As the number of planes increases, data on the planes increases accordingly, so that a data quantity to be processed increases.

The reason why the virtual planes are set around the outer periphery of the object is to avoid or omit processing data on the respective surface segments of the object by using data on the virtual planes to perform a data process (in the present embodiment, determination of the intersection of a projectile and the formation and movement of a shot hole) required for the object. Thus, the data processing accuracy improves along with an increase in the number of virtual planes, but the data processing speed decreases. In summary, the preferable number of virtual planes is required to be selected on the basis of the equilibrium between the number of virtual planes and the data processing speed/accuracy.

Reference symbols O11 and O12 denote the origins of virtual planes W11 and W12, respectively. The intersection determining unit 15 which performs the intersection determining process, using the object 20 having virtual planes attached thereto, executes the processes defined by the flow charts of FIGS. 6 and 7. When the intersection determining unit 15 determines that a virtual projectile has hit a virtual plane, it sets a hit flag Fk in the RAM 18 and stores a hit plane identifier hi indicative of the plane which the projectile has hit, and delivers the result of the determination to a shot hole calculating unit 16.

Figure 8:
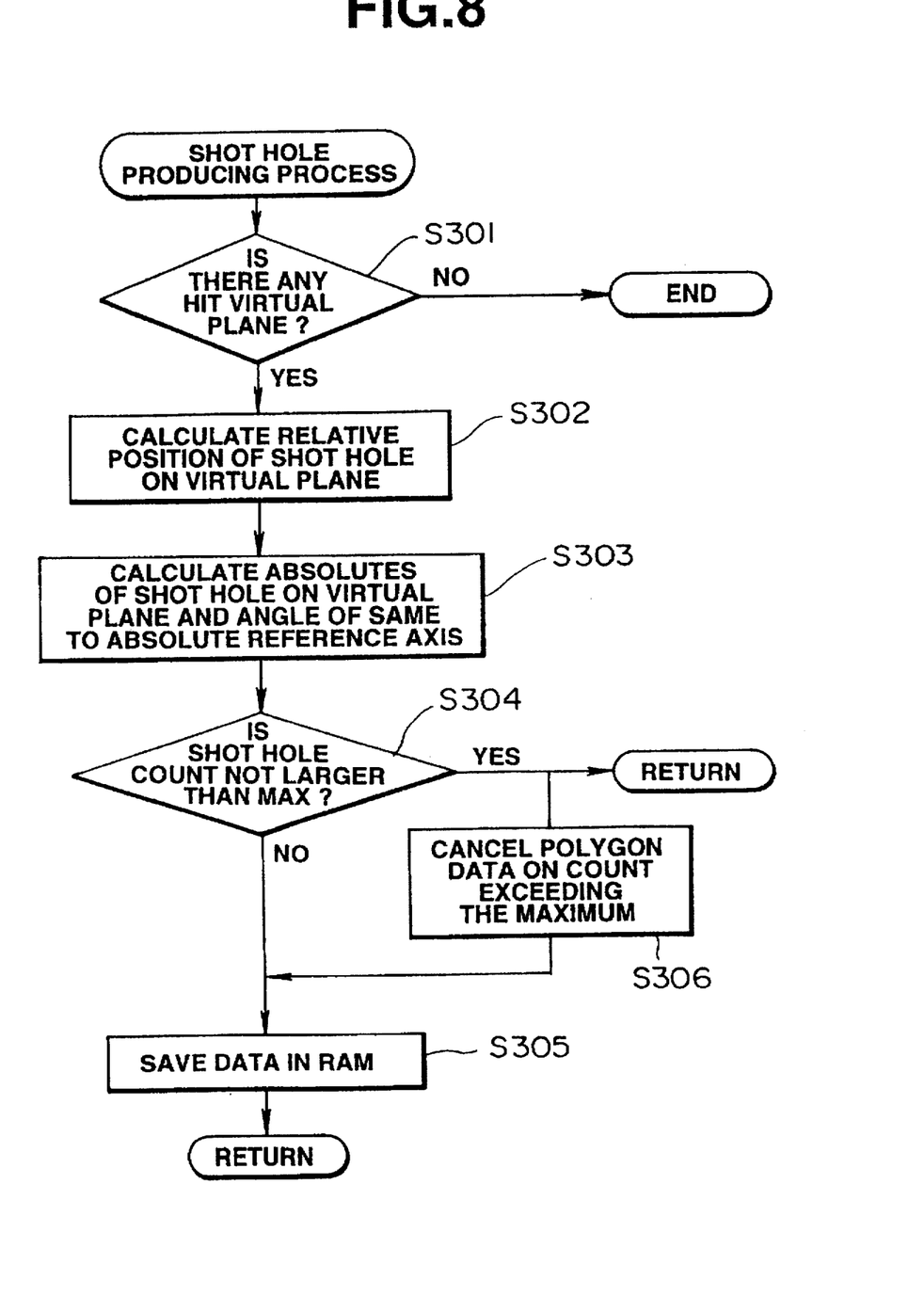
FIG. 8 is a flow chart indicative of the processing of a shot hole in the embodiment.

The shot hole calculating unit 16 performs processing represented by the flow chart of FIG. 8 to calculate the relative position of the shot hole produced in the virtual plane, calculates the absolute coordinate of the shot hole from the relative position of the shot hole and the angle of the virtual plane to the absolute reference axis, and stores those data as shot hole three-dimensional coordinate data Dd in the RAM 18.

The data Dd, thus obtained, is converted by the data processor 11 to data on coordinates viewed from a predetermined viewpoint or data on coordinates on the monitor and delivered as display data to display 3.

The operation of the embodiment will be described next with reference to FIGS. 6–8. FIG. 6 is a flow chart indicative of the intersection determining process performed in the embodiment. FIG. 7 is a flow chart indicative of a process for checking the priority of a virtual plane of FIG. 6. FIG. 8 is a flow chart indicative of a shot hole calculating process performed in the embodiment.

A projectile hit determining process will be described with respect to the routine of FIG. 6. First, the data processor 11 determines whether the player triggered the gun unit 4 (step S201).

If so (step S201, YES), the processing in step S202 and subsequent steps is performed. The I/F 2 calculates aimed x and y coordinate data S1 and S2 on the basis of the signal from the gun unit 4. The intersection determining unit 15 obtains coordinates (gx, gy) of the hit point on the display 3 at which the player shot, using the coordinate data S1 and S2 (step S202).

The coordinates (gx, gy) of the aimed point can be calculated as follows. The time taken from the time when the gun unit was triggered off to the time when a photodetector provided at the end of the gun unit detects a scan line on the monitor corresponding to the aimed point coordinates in a one-to-one relationship. Thus, by measuring the detection time, the aimed point coordinates are determined.

The intersection determining unit 15 sets a virtual plane to be checked (step S203). In this step, for example, it reads data on the coordinates and angle of the virtual plane W1 of the object 20 of FIG. 4 from the ROM 17 and sets the data in a predetermined register area of the processor 15.

The intersection determining unit 15 calculates the positions of points on the display 3 to which four three-dimensional (absolute) coordinates on the virtual plane W1 are projected, using a matrix conversion process (step S204). The intersection determining unit 15 determines whether the coordinates (gx, gy) are included in a square formed on the basis of those four points (the projected coordinates of the virtual plane W1 on the display 3) (step S205). By this processing, it is easily and rapidly determined whether an orbit (in the present embodiment, "trajectory") of the projectile intersects with the object. Even when the object is formed by a multiplicity of polygons, the projectile hit determining process is performed at high speed by determining whether there are any shot holes on the simplified virtual planes.

Assume that in step S205 the intersection determining unit 15 determines that the coordinates (gx, gy) are included in the projected coordinates of the virtual plane W1 on the display 3 or that the virtual plane intersects with the trajectory (in step S205, YES). In this case, the intersection determining unit 15 determines that the virtual plane has been shot and stores a hit flag Fk1 in a predetermined area of the RAM 18 (step S206).

When the intersection determining unit 15 determines that the coordinates (gx, gy) are not included in the projected coordinates (step S205, NO), it performs processing in step S206 and subsequent steps.

In step S207 the intersection determining unit 15 checks whether all the appropriate virtual planes have been checked. Since in this embodiment the object of FIG. 4 is employed, the intersection determining unit 15 determines whether all the virtual planes W1–W3 have been checked for an intersection. Since, at this time only, the virtual plane W1 has been checked, the intersection determining unit 15 determines that all the virtual planes have not yet been checked (step S207, NO). Therefore, the intersection determining unit 15 sets a virtual plane W2 to be checked next (step S208).

The intersection determining unit 15 calculates positions on the display 3 at which four three-dimensional coordinates on the virtual plane W2 are projected (step S204). The intersection determining unit 15 then determines whether the coordinates (gx, gy) are included in a square defined on the basis of those four points (projected coordinates of the virtual plane W2 on the display 3) (step S205). If so (step S205, YES), the intersection determining unit 15 stores a hit flag Fk2 for the virtual plane in a predetermined area of the RAM 18 (step S206).

When the intersection determining unit 15 determines that the coordinates (gx, gy) are not included in the projected coordinates (step S205, NO), the processing in step S207 and subsequent steps is performed.

In step S207 the intersection determining unit 15 checks whether all the virtual planes have been checked for the intersection. Since at this time only the virtual planes W1 and W2 have been checked, the intersection determining unit determines that all the planes have not yet been checked (step S207, NO). Thus, the intersection determining unit 15 sets the next virtual plane W3 (step S208).

The intersection determining unit 15 calculates positions on the display 3 to which the four three-dimensional coordinates on the virtual plane W3 are projected (step S204). The intersection determining unit 15 then determines whether the coordinates (gx, gy) are included in a square defined on the basis of the four points (the coordinates of the virtual plane W3 projected on the display 3) (step S205). When the intersection determining unit 15 determines that the coordinates (gx, gy) are included in the coordinates or the virtual plane W3 projected on the display 3 (step S205, YES), the intersection determining unit 15 stores a flag Fk3 on that virtual plane in a predetermined area of the RAM 18 (step S206). When the intersection determining unit 15 determines that the coordinates (gx, gy) are not included in the projected coordinates (step S205, NO), the processing in step S207 and subsequent steps is performed.

Generally speaking, when, for example, the virtual plane W1 is shot, other virtual planes W2 and W3 are not shot. As just described above, when the intersection determining unit 15 completes its determinations concerning all the required virtual planes W or the object 20 (step S207, YES), the intersection determining unit 15 determines whether the number n of virtual planes W which the projectiles hit is 0 (step S209). If so (step S209, YES), the intersection determining unit 15 terminates the processing by determining that no virtual planes W have been shot.

When the intersection determining unit 15 determines that the number n of shot virtual planes W is not 0 (step S209, NO), the intersection determining unit 15 determines whether the number or shot virtual planes W is not less than 2 (step S210).

If NO in step S210, the intersection determining unit 15 stores data on the identifier hi of the hit virtual planes hi in a predetermined area of RAM 18 (step S211) and terminates the processing.

When the intersection determining unit 15 determines that the number of hit virtual planes is not less than 2 (step S211, YES), it checks priorities or the virtual planes W1–W3 (step S212) and terminates the processing.

The intersection determining unit 15 checks the priorities (step S212) in a flow chart of FIG. 7 as follows: The intersection determining unit 15 calculates the distance between the position of a viewpoint and each of the virtual planes W which the projectiles hit (step S2121). The intersection determining unit 15 selects a virtual plane W whose distance to the viewpoint is minimum, using the result of the calculation of the distances, and clears the flags Fk of the virtual planes W other than the selected one (step S2122). As will be obvious from the above description, the hit flags are provided for the respective virtual planes. The intersection determining unit 15 stores the identifier hi or the virtual plane W involved in the minimum distance in a predetermined area of the RAM 18 (step S2123). As just described, when there are a plurality of virtual planes W, a virtual plane closest to the viewpoint or a virtual plane W having the highest priority is retrieved.

When there are a plurality of virtual planes traverse to the orbit of the projectile, processing for the formation of a shot hole only on a predetermined virtual plane, for example, closest to the viewpoint, is possible. As a result, the formation of shot holes (ornaments) on all the virtual planes traverse to the orbit is avoided. If it is considered that the virtual plane closest to the viewpoint is shot also in the actual shooting, such processing can be said to be appropriate. Thus, according to this embodiment, only the virtual plane closest to the viewpoint among the virtual planes transverse to the orbit is required to be marked with a shot hole, so that the calculation load is reduced.

The intersection determining unit 15 also delivers the identifier hi of the hit virtual plane W to the shot hole calculating unit 16 to thereby cause same to perform a shot hole leaving process.

The shot hole producing process is performed by a routine of FIG. 8. First, the shot hole calculating unit 16 determines whether there are any hit virtual planes W on the basis of the data from the intersection determining unit 15 (step S301). This determination is performed rapidly by checking stored data on the hit flag (FIG. 3). The shot hole calculating unit 16 ends the processing when there are no shot holes on the virtual plane W (step S301, NO).

When the shot hole calculating unit 16 determines that there is a shot hole in the virtual plane W (step S301, YES), it fetches the identifier hi of that virtual plane and calculates a relative position of the shot hole on the appropriate virtual plane W (step S302). The relative position implies the position of the shot hole relative to the origin of that virtual plane. Such position includes the three-dimensional coordinate components of the shot hole relative to the origin or the virtual plane and an angle θ of a virtual plane to a reference axis.

The shot hole impact calculating unit 16 calculates three-dimensional absolute coordinates of the position of the shot hole in the virtual plane W and the angle of the virtual plane to the absolute reference axis, using data on the calculated relative position (step S303).

Figure 16:
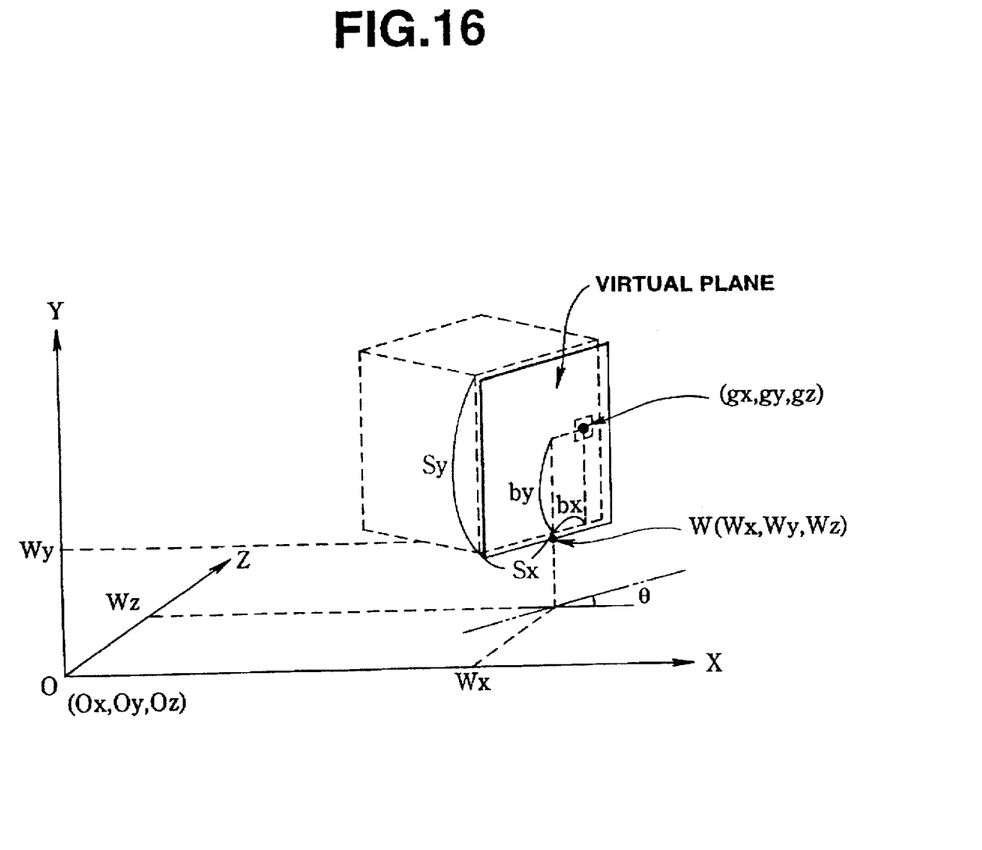
FIG. 16 illustrates the relationship between a relative and an absolute position of a shot hole in the embodiment.

Calculation of the absolute coordinates of a virtual plane from the relative coordinates of a shot hole and the four corners of the virtual plane will be described with reference to FIG. 16 next.

The origin coordinates W (Wx, Wy, Wz) of the virtual plane are given by coordinates relative to the absolute origin coordinates O (Ox, Oy, Oz). The virtual plane has an angle θ to the absolute X axis. In the virtual plane x-y coordinate system, the four corner-point coordinates of the virtual plane are expressed by relative coordinates (Sx, O), (–Sx, 0), (Sx, Sy) and (–Sx, Sy) distant from the origin of the virtual plane Deviations or relative coordinates (bx, by) of the shot hole from the origin of the virtual plane are calculated. The absolute coordinates of the shot hole are obtained by setting the origin or the virtual plane at a point W (Wx, Wy, Wz) remote from the absolute origin O, rotating a coordinate system of the virtual plane through an angle θ from the X axis, and fixing the position of the shot hole at a position (gx, gy, gz) separated by distances (bx, by, 0) from the point W.

The shot hole occupies a predetermined area and is formed of at least one polygon obtained on the basis of data on the absolute positions which have been subjected to transformation. The relation between the coordinate positions and the corresponding polygons is set as data in a predetermined storage area of the ROM 17, preferably, in the form of a memory table.

By such calculations, a shot hole is formed in one of the virtual planes set around the outer surface of the object 20 of FIG. 4. Thereafter, data on the shot hole is displayed as an image viewed from a predetermined viewpoint by matrix transformation of data on the shot hole into the screen coordinate system. Thus, it is unnecessary to determine whether all the polygons are shot and to display the resulting shot holes, if any, but it is required to determine whether only the simplified virtual plane has been shot and to indicate the resulting shot hole, if any. Thus, according to the present embodiment, the calculation process load is reduced.

The calculation of the relative coordinates of the shot hole will be described next. A point on the display 3 to which a point in the three-dimensional space, such as on the object 20 of FIG. 4, is projected is calculated on the basis of an affine transformation matrix M obtained by movement and rotation transformation matrix operations on a matrix of data on the position and angle of a viewpoint, and a focus value which determines an angle or visibility. The matrix affine transformation M is given by $$M = \begin{matrix} m_{00} & m_{01} & m_{02} & m_{03} \\ m_{10} & m_{11} & m_{12} & m_{13} \\ m_{20} & m_{21} & m_{22} & m_{23} \\ m_{30} & m_{31} & m_{32} & m_{33} \end{matrix} \qquad \text{Eq. (1)}$$

The coordinates of a projection point are expressed as $$g_x = f(m_{30}, m_{32})$$
$$g_y = f(m_{31}, m_{32}) \qquad \text{Eq. (2)}$$

where r is a function to calculate the projection point on the display 3.

In this way, a point in the three-dimensional space is obtained as a point on the display 3 to which the former point is projected, which implies that the point in the three-dimensional space is similar to a point picked up by a camera placed at a position and an angle to a reference axis and is displayed as an image picked up by the camera on the display 3.

When the gun unit on the control panel 2 is aimed at a position and fired to obtain the point of a shot hole, the coordinate (gx, gy) on the display 3 at this time becomes known.

A method of determining which point on the hit virtual plane W corresponds to the coordinates (gx, gy) will be described next. Let O be the origin of the hit virtual plane W and let V be a matrix of that origin O. Assuming the hit point is a point (x, y, 0) distant by x and y in the X and Y directions from the origin O of the hit virtual plane W, a matrix P of this point is given by $$P = TV \qquad \text{Eq. (3)}$$

where $$T = \begin{matrix} 1 & 0 & 0 & 0 \\ 0 & 1 & 0 & 0 \\ 0 & 0 & 1 & 0 \\ x & y & 0 & 1 \end{matrix}$$

$$V = \begin{matrix} v_{00} & v_{01} & v_{02} & v_{03} \\ v_{10} & v_{11} & v_{12} & v_{13} \\ v_{20} & v_{21} & v_{22} & v_{23} \\ v_{30} & v_{31} & v_{32} & v_{33} \end{matrix}$$

-continued $$P = \begin{matrix} P_{00} & P_{01} & P_{02} & P_{03} \\ P_{10} & P_{11} & P_{12} & P_{13} \\ P_{20} & P_{21} & P_{22} & P_{23} \\ P_{30} & P_{31} & P_{32} & P_{33} \end{matrix}$$

The matrix P is calculated as $$P = \begin{matrix} V_{00} & V_{01} & V_{02} & V_{03} \\ V_{10} & V_{11} & V_{12} & V_{13} \\ V_{20} & V_{21} & V_{02} & V_{22} \\ V_{00}x + V_{10}y + V_{30} & V_{01}x + V_{11}y + V_{31} & V_{02}x + V_{12}y + V_{32} & V_{03}x + V_{13}y + V_{33} \end{matrix} \quad \text{Eq. (4)}$$

Thus, gx and gy are expressed as $$g_x = f(P30, P32)$$
$$g_y = f(P31, P32). \quad \text{Eq. (5)}$$

P30–P33 are expressed from Eq. (4) as $$P30 = V00x + V10y + V30 \quad \text{Eq. (6)}$$
$$P31 = V01x + V11y + V31$$
$$P32 = V02x + V12y + V32.$$

Thus, the expression (5) is expressed by simultaneous linear equations with two unknowns, so that the value of the moved point (x, y) is calculated easily. A method or calculating absolute position data from the coordinates of this point is as described above.

The shot hole calculating unit 16 then determines whether the shot hole count is not larger than a maximum predetermined value, using the coordinates, thus obtained (step S304). If so (step S304, YES), the count which exceeds the maximum value is canceled (step S306) and the remaining data is processed in step S305.

When the shot hole count is not more than the maximum predetermined value (step S304, NO), the data, thus obtained, is saved in the RAM 18 of the memory 12 (step S305).

Thus, the data processor 11 regards a projectile as having hit a point having coordinates (x, y) distant from the origin O of the hit virtual plane W on the basis of the data stored in the RAM 18, creates image data on a picture with a shot hole formed in the coordinate system of the virtual plane W, and delivers the image data to the display, which can display the shot hole on the polygon as if the shot hole were formed due to a hit of a projectile.

As just described above, in the present embodiment, a virtual plane is formed on the basis of a predetermined projection plane of the three-dimensional object, and positioned at the position of the predetermined projection plane, and the intersection is calculated from the coordinates of the virtual plane and the trajectory of a virtual projectile. In the present embodiment, a point on the virtual plane W having the intersection, thus obtained, and corresponding to the coordinates of the intersection is calculated.

In this case, a matrix P of a position corresponding to the coordinates of the intersection in the virtual plane W is expressed as P=TV where V is a matrix of the origin of the virtual plane W, and T is a transformation matrix, so that the shot hole can be left at the point P of the virtual plane W.

Figure 9A:
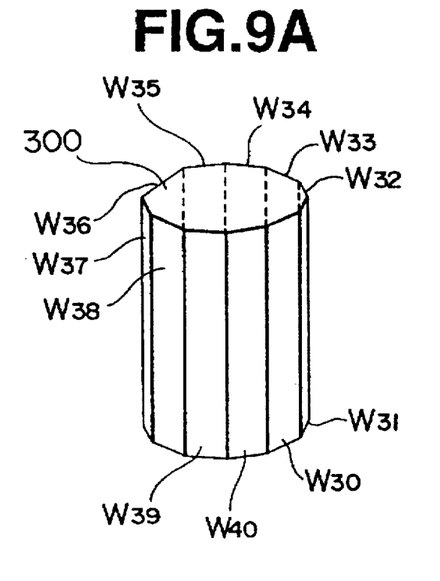
FIGS. 9A and 9B illustrate virtual planes used in the embodiment.
Figure 9B:
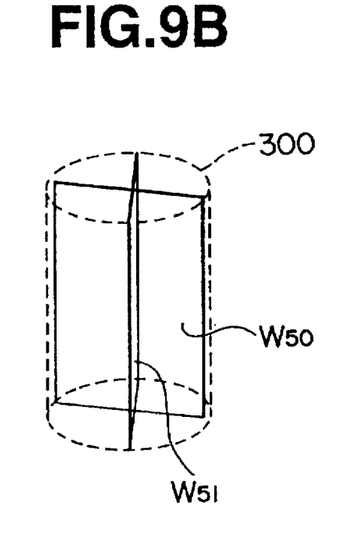
Figure 10:
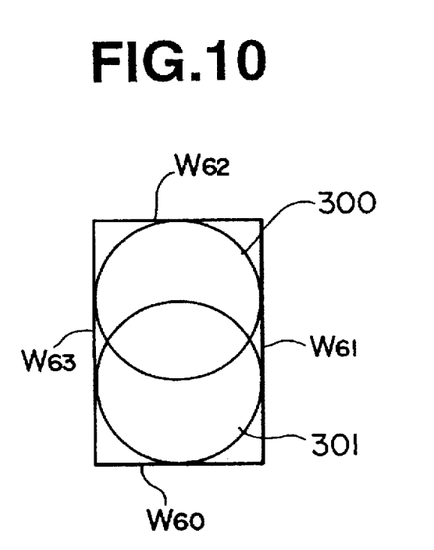
FIG. 10 illustrates other virtual planes used in the embodiment.
Figure 11:
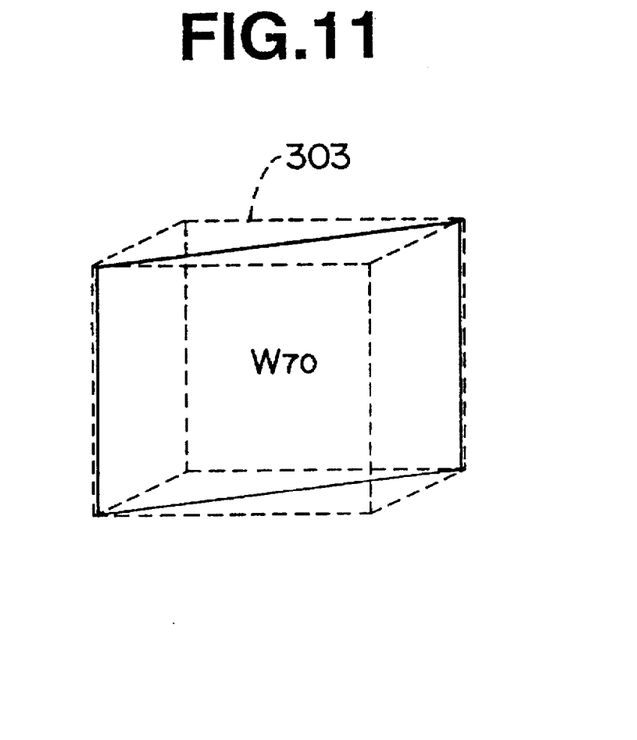
FIG. 11 illustrates further virtual plane used in the embodiment.

While in the embodiment a virtual plane W shown in FIG. 4 or 5 has been formed to leave a shot hole, for example, a plurality of virtual planes W30–W40 forced on the outer periphery of a cylinder 300, as shown in FIG. 9A, or crossing virtual planes W50 and W51 provided within a cylinder 300, as shown in FIG. 9B, may be used if only a hit is required to be determined. Alternatively, visual planes W60–W63 of a cuboid cover two overlapping cylinders 300 and 301, shown in FIG. 10, or a virtual plane W70 extending between diagonal corners of a cuboid 303, shown in FIG. 11, may be used.

Figure 12:
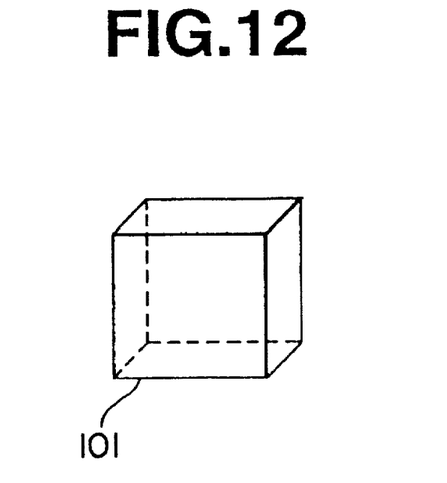
FIG. 12 shows an object used in the embodiment.
Figure 13:
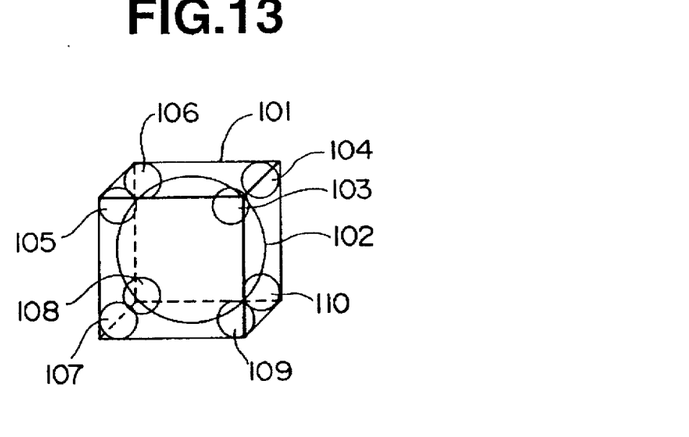
FIG. 13 shows a ball which approximates the object.
Figure 14:
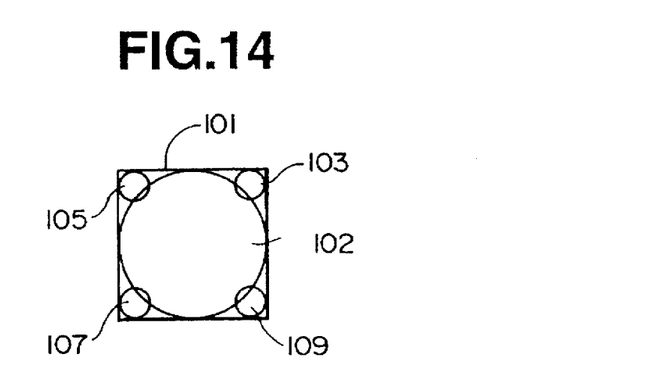
FIG. 14 is a front view of the object or FIG. 13.
Figure 15:
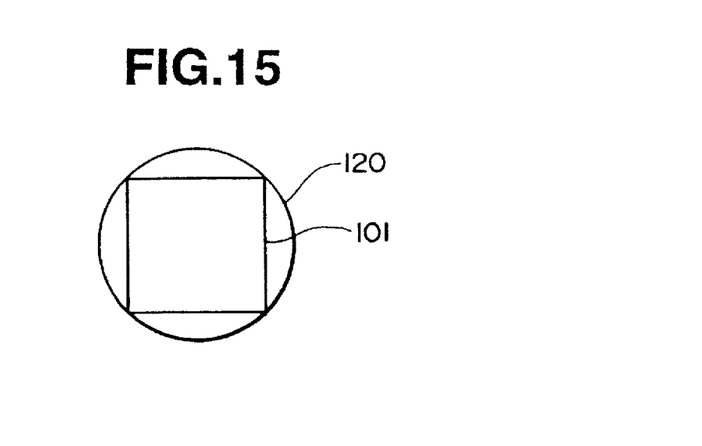
FIG. 15 shows a solid body used in the embodiment and a ball which contains the solid body.

It is considered that a regular hexahedral object 101 of FIG. 12 is approximated by a larger ball 102 inscribed in the object 101, and a plurality of smaller balls 103–110 (FIGS. 13, 14), or with a larger circumscribing ball (FIG. 15). In the former, the determination of the intersection of the respective balls 102–110 with the orbit is required to be made, which would increase the amount of calculation. In the latter, the outer periphery of the ball 120 expands beyond the inscribed object 101, so that accurate determination of the intersection of the outer periphery of the ball 120 with the orbit cannot be made. In contrast, according to the present embodiment, a virtual plane is provided only on the surface of the object which is displayed on the display, and it is determined whether only that virtual plane is intersected with the orbit. Thus, the calculation load is reduced. Since the configuration of the virtual plane coincides with that of one of the surfaces of the object 101, accurate determination of the intersection is achieved.

As described above, according to the image processing device of the present invention, virtual planes are set around the object so that data processing required for the object is performed on the basis of data on such virtual planes. Thus, data required for the object is easily and rapidly processed without performing an image processing operation on each of the polygons.

Since the image-processing device is arranged such that it is determined on the basis of data on the position of a virtual plane and a predetermined orbit whether the orbit intersects with the virtual plane. Thus, it is rapidly determined whether there is an intersection where the orbit intersects with the object.

When data on the intersection is converted to display data to display the intersection on the object, the data to be converted is confined to virtual plane data. Thus, a data quantity to be processed is reduced and the calculating speed is improved compared to the case in which data on the respective points of the object is processed.

Even when it is determined whether the aimed orbit of the gun unit intersects with a virtual plane, the determination about the intersection of a projectile with the object and display of the shot hole are performed easily and rapidly.

By providing flat virtual planes close to the outer surface or the object, the shot hole is arranged to appear normally on the surface of the object.

By using the result of the determination about a virtual plane having the highest priority, processing for display of the intersections on all of the virtual planes is prevented to thereby improve the processing speed.

Whether the intersection area is confined to the virtual plane is determined on the basis of data on the position of an area where the orbit intersects with a display coordinate system of the display means and data on a position in the display coordinate system of the display means where the virtual plane is projected. If the intersection area is within the confines or the virtual plane, it is determined that the orbit intersects with the virtual plane. Thus, it is determined easily whether there is any intersection where the orbit intersects with the virtual plane, using data on a two-dimensional coordinate of the intersection where the orbit intersects with the display coordinate system without changing the data.

In addition, since the intersection is set on the virtual plane, coordinate transformation of the intersection is performed easily and rapidly to thereby display the result of the calculation even when the viewpoint moves.

According to the present invention, many changes and modifications are possible without departing from the spirit, main features and scope of the invention defined in the appended claims. Thus, the above embodiments are merely illustrative in all respects and should not be construed as being restrictive. For example, the present invention is not restricted to a shooting game using a gun unit, but is applicable in the determination of the intersection of two objects in a three-dimensional image.

What is claimed is:

1. An image processing method for converting an object defined by three-dimensional coordinate data into a two-dimensional image producing a view from a predetermined viewpoint displayed on a display means, comprising the steps of:

storing data defining the coordinates of the object;

setting a predetermined virtual plane around the object on the basis of the data defining the coordinates of the object; and determining whether a predetermined locus intersects the virtual plane from the data defining the position of the virtual plane and data defining the position of the predetermined locus.

2. An image processing method according to claim 1, further comprising the steps of:

calculating coordinates of an intersection where the virtual plane intersects the predetermined locus; and displaying the intersection on the basis of the coordinates of the intersection.

3. An image processing method according to claim 2, further comprising the step of displaying the intersection on the virtual plane.

4. An image processing device, which converts an object defined by three-dimensional coordinate data into a two-dimensional image producing a view from a predetermined viewpoint displayed on a display means, comprising:

object data storage means for storing coordinate data defining the object;

plane establishing means for setting a predetermined virtual plane around the object on the basis of the coordinate data defining the object; and data processing means for conducting a predetermined image process for the virtual plane surrounding the object so as to express a result of the predetermined image process on the virtual plane.

5. An image processing device according to claim 4, wherein said data processing means comprises intersection determining means for determining, from data defining the position of the virtual plane and data defining the position of a predetermined locus, whether the locus intersects the virtual plane.

6. An image processing device according to claim 5, wherein said data processing means further comprises:

display processing means for calculating data defining coordinates of the intersection where the predetermined locus intersects the virtual plane and for displaying the intersection on the display means on the basis of the data defining coordinates of the intersection.

7. An image processing device according to claim 6, wherein said display processing means displays the intersection on the virtual plane.

8. An image processing device according to claim 7, wherein the virtual plane comprises a plane set close to the outer periphery of the object.

9. An image processing device according to claim 8, wherein the virtual plane comprises a plane in which the object is projected onto the display means.

10. An image processing device according to claim 6, wherein when there is a plurality of virtual planes intersecting with a predetermined locus, said data processing means calculates the priority of each of the virtual planes, and wherein said display processing means displays on the display means the intersection of the locus with a virtual plane having the highest priority on the basis of the data defining coordinates of the intersection.

11. An image processing device according to claim 6, wherein the virtual plane comprises a plane set close to the outer periphery of the object.

12. An image processing device according to claim 11, wherein the virtual plane comprises a plane in which the object is projected onto the display means.

13. An image processing device according to claim 5, wherein the virtual plane comprises a plane set close to the outer periphery of the object.

14. An image processing device according to claim 13, wherein the virtual plane comprises a plane in which the object is projected onto the display means.

15. An image processing device according to claim 4, wherein the virtual plane comprises a plane set close to the outer periphery of the object.

16. An image processing device according to claim 15, wherein the virtual plane comprises a plane in which the object is projected onto the display means.

17. An image processing device according to any one of claims 5–16, wherein said predetermined locus comprises an aimed linear locus oriented from outside the display means to a two-dimensional image on the display means.

18. An image processing device according to claim 17, wherein said data processing means selects a virtual plane closest to the coordinates of a viewpoint from among the plurality of virtual planes which intersects the predetermined locus.

19. An image processing device according to claim 17, wherein said intersection determining means determines whether the coordinates defining the intersection of the aimed linear locus with the two-dimensional image on the display means are contained in the virtual plane to thereby determine whether the aimed linear locus intersects the virtual plane.

20. An image processing device according to claim 4, wherein the virtual plane is provided only in the vicinity of a portion of the object on the side of the coordinates defining the viewpoint.

21. An image processing device according to any one of claims 13–9, wherein said predetermined locus comprises an aimed linear locus oriented from outside the display means to a two-dimensional image on the display means.

22. An image processing device according to claim 21, wherein said data processing means selects a virtual plane closest to the coordinates of a viewpoint from among the plurality of virtual planes which intersects the predetermined locus.

23. An image processing device according to claim 21, wherein said intersection determining means determines whether the coordinates defining the intersection of the aimed linear locus with the two-dimensional image on the display means are contained in the virtual plane to thereby determine whether the aimed linear locus intersects the virtual plane.

* * * * *